United States Patent [19]

Schmotzer

[11] 4,143,723

[45] Mar. 13, 1979

[54] CARBIDE TIPPED DRILL BIT FOR BORING HOLES IN CONCRETE AND STEEL

[76] Inventor: Norman H. Schmotzer, 2532 Palmarito Rd., West Palm Beach, Fla. 33406

[21] Appl. No.: 839,314

[22] Filed: Oct. 4, 1977

[51] Int. Cl.² .................. F21C 13/01; B23B 51/02
[52] U.S. Cl. .................... 175/410; 175/394; 175/421; 408/144; 408/230
[58] Field of Search .............. 175/394, 395, 409, 410, 175/421; 76/108 A, 108 R; 407/53, 54, 118; 408/57, 59, 144, 145, 199, 227–230

[56] References Cited

U.S. PATENT DOCUMENTS

| | | | |
|---|---|---|---|
| 2,673,714 | 3/1954 | Hargrave | 175/394 |
| 3,163,246 | 12/1964 | Vagins et al. | 175/410 |
| 3,674,101 | 7/1972 | Chromy | 175/410 |

*Primary Examiner*—Robert Louis Spruill

[57] ABSTRACT

A drill bit having a carbide tip brazed in the drill bit shank is disclosed for use in forming cylindrical holes in both concrete and steel by rotation about a central axis. The carbide tip has two side surfaces on opposite sides of said central axis. The top surfaces are connected by a substantially V-shaped notch which extends between the side surfaces and has its vertex off-center of the central axis to more effectively cut both concrete and steel.

11 Claims, 5 Drawing Figures

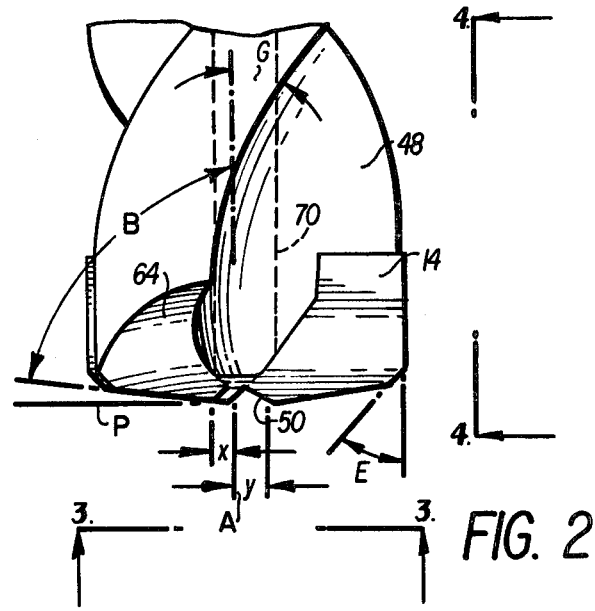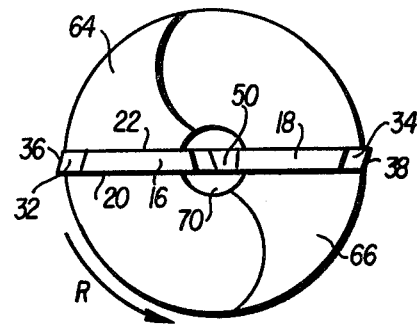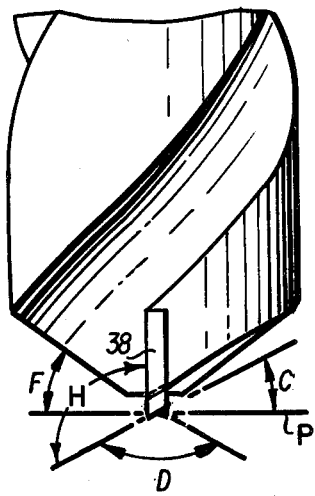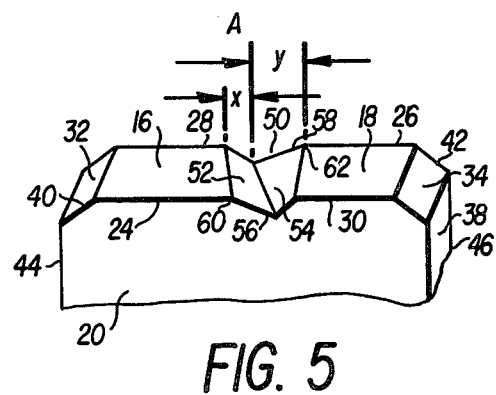

CARBIDE TIPPED DRILL BIT FOR BORING HOLES IN CONCRETE AND STEEL

BACKGROUND OF THE INVENTION

This invention relates to drills of the carbide tip type and more particularly to such a drill having a tip capable of boring closely controlled hole sizes in both concrete and steel.

There is a great need for a single, relatively inexpensive drill capable of boring precision size holes in concrete and capable of continuing to bore the same size hole in reinforcing steel rod should it be encountered in the concrete. Such precision type holes are required, for example, where anchors of the wedge-type are desired or required to be used.

The prior art discloses numerous types of drill bits having a carbide tip capable of boring a hole in concrete and numerous types of carbide tipped drills for boring holes in steel. Applicant is unaware of any single drill in the prior art capable of drilling masonry such as hard concrete while maintaining a closely controlled hole diameter and which can also effectively bore the same size hole in steel such as that found in reinforcing rod imbedded in the concrete. Masonry drills of the prior art having diamond tips have been somewhat effective in boring precision size holes in concrete, however, such drills are very costly and ineffective when steel is encountered in the concrete often in the form of reinforcing rod.

It is therefore the primary object of the present invention to provide a drill capable of boring closely controlled hole sizes in both concrete and steel.

It is another object of the present invention to provide a drill having a carbide tip capable of boring a large number of holes in both concrete and steel without becoming dull or breaking.

It is yet another object of the present invention to provide such a drill with a carbide tip which can be reground to the proper cutting angles without difficulty.

It is a further object to provide a drill for both masonry and steel that can be used wet or dry but is not required to be cooled or flushed as some other drills.

Other and further objects will become apparent from the following description taken in conjunction with the accompanying drawing in which:

FIG. 1 is a side elevational view of the drill;

FIG. 2 is an enlarged side view of the bit portion of the drill of FIG. 1;

FIG. 3 is an end view of the drill of FIG. 2 taken along the lines 3—3 of FIG. 2;

FIG. 4 is a side view of the drill of FIG. 2 taken along the lines 4—4 of FIG. 2; and FIG. 5 is a perspective view of the tip of the drill.

DETAILED DESCRIPTION OF THE PREFERRED EMBODIMENT

The drill 10 comprises a steel shank 12 and a carbide tip 14 brazed in the end of the shank or the drill may comprise a single piece of carbide forming both the shank and the tip. The shank 12 is adapted to be held in a chuck and rotated about the central axis A in the direction R for drilling holes having closely controlled diameters in both concrete and steel.

The tip 14 has two main flat top surface areas 16, 18 located between front face 20 and rear face 22 both of which faces are parallel to the central axis A. The top surface 16 forms one main cutting edge 24 where it intersects front face 20 and top surface 18 forms another main cutting edge 26 where it intersects rear face 22. The top surfaces 16, 18 extend away from the central axis at an angle B of between 78 and 82 degrees with respect to the central axis A and are at an angle C of between 4.5° and 10.5° with respect to a plane P normal to the central axis A. Back edges 28, 30 respectively, are formed where the top surface 16 intersects rear face 22 and top surface 18 intersects front face 20. A plane through cutting edge 24 and back edge 28 will intersect a plane through front face 20 at an angle H of between 79.5 and 82.5 degrees axis as does a plane through cutting edge 26 and back edge 30 also intersect a plane through rear face 22. The two aforementioned planes intersect each other at an obtuse angle D of between 162 and 165 degrees (acute angle 15 to 18 degrees). The tip 14 also has two secondary top surface areas 32, 34 which are located on either side between top surface 16 and the side face 36, and the top surface 18 and side face 38, respectively. The secondary top surface 32 forms a cutting edge 40 where it intersects front face 20 and secondary top surface 34 forms a cutting edge 42 where it intersects rear face 22. The secondary top surfaces 32, 34 extend from top surfaces 16 and 18, respectively, at an angle E of 45° with respect to the central axis A.

In addition to the cutting edges 24, 26, 40 and 42, associated with top surfaces 16, 18, 32 and 34 respectively, there is a side cutting edge 44 formed by the intersection of the front face 20 and side face 36 and a side cutting edge 46 formed by the intersection of the rear face 22 and side face 38. The cutting edges 44, 46 so formed are parallel to the central axis A and it is the diagonal distance between the cutting edges 44 and 46 through the central axis A that determines the diameter hole capable of being bored. The flutes 48 serve, as in any conventional drill, to transmit the severed material from the area adjacent the cutting edges of the bit, and are concave in shape or shaped as a "V" notch, the intersecting surfaces of which form an included angle of 85° to 105°.

The cutting edges 24, 26, 40, 42, 44 and 46 as well as their novel configuration and angles associated therewith both to the tip surfaces which form the angles as well as those angles measured with respect to the central axis A result in a tip which is very effective in boring holes in concrete with excellent control over the size of the hole being bored. Applicant has discovered, in addition, that by forming a V-shaped notch 50 between the top surface areas 16, 18 and positioning the notch off-center of the central axis A, the tip resulting therefrom is capable of cutting steel as well as concrete. In addition, the control over the size of the hole being bored throughout its length was also materially increased.

The notch 50 has side walls 52, 54 which extend between front face 20 and rear face 22. As the side wall 52 intersects front face 20, a cutting edge 56 is formed and as the side wall 54 intersects rear face 22, a cutting edge 58 is formed. As the tip 14 engages the workpiece (not shown), the point 60 where cuttings edges 24 and 56 meet and the point 62 where cutting edges 26 and 58 meet, are the starter or first part of the tip 14 to begin cutting. The cutting edges 24, 26 are next to engage the workpiece gradually throughout their length. The cutting edges 40, 42 follow to bring the hole being bored to the exact diameter of the tip 14 whereupon the side cutting edges 44, 46 take over to smooth out the wall of the hole to the exact diameter. Because the V-shaped notch 50 and the cutting edges 56, 58 associated therewith are off-center of the central axis, the distance X shown in FIG. 2 does not equal the distance Y and thus not only are the starter points 60, 62 off center but the top surfaces 16 and 18 are of unequal area and the cutting edges 24, 26 associated respectively therewith are also of unequal length. It is this combination of off-center starter points 60, 62 top surfaces 16, 18 and cutting edges 24, 26 that are primarily responsible for enabling applicant's unique bit to be capable of cutting both concrete and steel.

The backoff angle F of the bit surfaces 64, 66 is approximately 45° with respect to the plane P and the helix angle G is between 27° and 33° also with respect to the central axis A.

The drill 10 can also be provided with a bore 70 concentric with the central axis A, as shown by the phantom lines in FIGS. 2 and 3, for permitting a lubricant or coolant to pass to the area of cutting tip.

The drill of the present invention as herein described can be used repeatedly to drill a large number of holes in both concrete and steel without becoming dull rapidly in addition, the cutting edges can be often reground before the drill must be discarded.

While the invention has been particularly shown and described with reference to a preferred embodiment thereof, it will be understood by those skilled in the art that various changes in form and details may be made therein without departing from the spirit and scope of the invention.

What I claim is:

1. A drill for forming cylindrical holes in both concrete and steel, said drill having a bit containing a carbide tip with first and second flat surfaces on opposite sides of the central axis of said drill and having a front and back face extending parallel to said central axis, said front and back faces intersecting with said first and second flat surfaces respectively to form cutting edges wherein the improvement comprises a notch extending between said first and second flat surfaces and said front and back faces, said notch defining sidewalls and having cutting edges formed by the intersection of said sidewalls and said front and back faces to effectively cut said concrete and steel.

2. A drill as set forth in claim 1 wherein said notch is substantially V-shaped.

3. A drill as set forth in claim 1 wherein said notch is off-center of said central axis to enable said cutting edges formed by said front and back faces and said sidewalls to more effectively cut concrete and steel.

4. A drill as set forth in claim 1 further comprising edge surfaces adjacent said first and second flat surfaces, said edge surfaces extending at an angle of approximately 45 degrees with respect to said central axis.

5. A drill as set forth in claim 4 wherein a cutting edge is formed at the intersection of said edge surfaces and said faces.

6. A drill as set forth in claim 1 wherein the surface area of said first flat surface is greater than the surface area of said second flat surface.

7. A drill as set forth in claim 1 wherein said flat surfaces are at an angle of between 79.5 and 82.5 degrees with respect to said front and back faces.

8. A drill as set forth in claim 1 wherein said flat surfaces are trapezoidal in shape.

9. A drill as set forth in claim 1 wherein said flat surfaces lie in different planes.

10. A drill as set forth in claim 9 wherein said planes intersect each other at an angle of between 15 and 18 degrees.

11. A drill as set forth in claim 1 wherein said bit has a bore concentric and coextensive with said central axis to permit a lubricant to pass to the area of the cutting tip.

* * * * *